US012211643B2

(12) United States Patent
Kim

(10) Patent No.: US 12,211,643 B2
(45) Date of Patent: Jan. 28, 2025

(54) SOLENOID COIL STRUCTURE, SOLENOID COIL ASSEMBLY, AND CONTROL DEVICE

(71) Applicant: HL MANDO CORPORATION, Pyeongtaek-si (KR)

(72) Inventor: Minseong Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 715 days.

(21) Appl. No.: 17/203,989

(22) Filed: Mar. 17, 2021

(65) Prior Publication Data

US 2021/0296038 A1 Sep. 23, 2021

(30) Foreign Application Priority Data

Mar. 17, 2020 (KR) ........................ 10-2020-0032836

(51) Int. Cl.

*H01F 5/04* (2006.01)
*H01F 7/06* (2006.01)
*H01F 7/08* (2006.01)
*H01F 7/128* (2006.01)
*H01F 27/32* (2006.01)

(52) U.S. Cl.

CPC ............... *H01F 7/081* (2013.01); *H01F 5/04* (2013.01); *H01F 7/064* (2013.01); *H01F 7/128* (2013.01); *H01F 27/325* (2013.01); *H01F 2007/062* (2013.01)

(58) Field of Classification Search

CPC . H01F 7/081; H01F 5/04; H01F 7/064; H01F 7/128; H01F 27/325; H01F 2007/062; H01F 7/16; H01F 27/2828; H01F 2005/043

See application file for complete search history.

(56) References Cited

U.S. PATENT DOCUMENTS 3,786,383 A * 1/1974 Ludwig .................... H01F 7/066 335/231
4,233,583 A * 11/1980 Novacek ............... H01F 7/1607 335/301
4,363,014 A * 12/1982 Leach ........................ H01F 5/04 336/208

(Continued)

FOREIGN PATENT DOCUMENTS

JP 2019113003 A * 7/2019
KR 10-2010-0034650 A 4/2010

OTHER PUBLICATIONS

Office Action dated Apr. 18, 2024 for corresponding Korean Patent Application No. 10-2020-0032836, along with an English machine translation (9 pages).

*Primary Examiner* — Mang Tin Bik Lian
(74) *Attorney, Agent, or Firm* — Hauptman Ham, LLP

(57) ABSTRACT

Provide are a solenoid coil structure, a solenoid coil assembly and a control device each including the same. The solenoid coil structure includes: a bobbin having a cylindrical body about which a coil is wound and a plurality of lead-pin coupling parts extending on the body in an axial direction; and a housing having an outer side surface covering an outer circumferential surface of the body, and an end surface which the plurality of lead-pin coupling parts pass through and protrude from and which is located on an end of the outer side surface in the axial direction.

14 Claims, 12 Drawing Sheets

(56) References Cited

U.S. PATENT DOCUMENTS

| | | | | | |
|---|---|---|---|---|---|
| 5,281,940 | A * | 1/1994 | Goto | H01H 50/40 | 335/282 |
| 5,673,013 | A * | 9/1997 | Moody | H01F 5/02 | 336/208 |
| 6,124,775 | A * | 9/2000 | Linkner, Jr. | B60T 8/363 | 335/278 |
| 6,369,682 | B1 * | 4/2002 | Thompson, Jr. | H01F 7/06 | 336/198 |
| 7,750,786 | B2 * | 7/2010 | Last | H01F 5/04 | 336/208 |
| 8,193,890 | B2 * | 6/2012 | Gonzalez Romero | H01F 41/076 | 336/182 |
| 2004/0252003 | A1 * | 12/2004 | Linkner, Jr. | H01F 7/1607 | 336/208 |
| 2012/0228534 | A1 * | 9/2012 | Kellner | H01F 5/02 | 242/430 |
| 2016/0217912 | A1 * | 7/2016 | Yun | H01F 7/126 | |
| 2017/0213629 | A1 * | 7/2017 | Goto | H01F 41/10 | |

* cited by examiner

50 : 50a,50b

10 : 110,120
120 : 120a,120b,120c,120d

10 : 110,120
120 : 120a,120b,120c,120d

120 : 120a,120b,120c,120d

120 : 120a,120b,120c,120d

SOLENOID COIL STRUCTURE, SOLENOID COIL ASSEMBLY, AND CONTROL DEVICE

CROSS-REFERENCE TO RELATED APPLICATIONS

This application claims priority to and the benefit of Korean Patent Application No. 10-2020-0032836, filed on Mar. 17, 2020, the disclosure of which is incorporated herein by reference in its entirety.

BACKGROUND

1. Field of the Invention

The present disclosure relates to a solenoid coil, and more particularly, to a solenoid coil structure, a solenoid coil assembly and a control device each including a plurality of solenoid coil structures.

2. Discussion of Related Art

A solenoid valve is used in a brake electronic control unit (ECU), such as an anti-lock brake system (ABS) ECU or an electronic stability control (ESC) system ECU, of a vehicle.

The solenoid valve includes a solenoid coil assembly about which a coil is wound to form an electric field when power is supplied thereto, and a valve assembly, i.e., a hydraulic control unit (HCU), configured to open or close a flow path by the electric field formed in the solenoid coil assembly. In general, the solenoid coil assembly may be installed in an ECU, together with a circuit board, and the valve assembly may be pressed in a hydraulic block.

The solenoid coil assembly includes a plurality of solenoid coil structures. Each of the plurality of solenoid coil structures includes a bobbin with a coil wound thereon and a lead pin for connecting the coil to the circuit board.

However, in the solenoid coil assembly, the plurality of solenoid coil structures are not arranged to be parallel on the circuit board due to a position of a valve and the like and thus are arranged in a random pattern (e.g., a zigzag pattern). Therefore, the lead pin of each of the solenoid coil structures is not arranged to be parallel with the lead pins of the other solenoid coil structures.

As a result, a bus bar for connecting the lead pins included in the plurality of solenoid coil structures is not in a linear form but has a complicated shape. That is, in the case of a solenoid coil assembly of the related art, a shape of a common bus bar that connects lead pins of a plurality of solenoid coil structures varies according to a system, and various types of bus bars are required according to locations thereof even in the same system. Accordingly, a shape of a bus bar becomes complicated, and the number of desired bus bars is large.

SUMMARY OF THE INVENTION

To address the above-described problem with the related art, the present disclosure is directed to providing a solenoid coil structure with a high degree of freedom in selecting a lead-pin coupling position, in which a coupling position of a lead pin is appropriately selectable when necessary and thus a shape of a bus bar may be simplified when the solenoid coil assembly is configured, a solenoid coil assembly including the solenoid coil structure, and a control device including the solenoid coil structure.

According to an aspect of the present disclosure, a solenoid coil structure comprises: a bobbin having a cylindrical body about which a coil is wound and a plurality of lead-pin coupling parts extending on the body in an axial direction; and a housing having an outer side surface covering an outer circumferential surface of the body, and an end surface which the plurality of lead-pin coupling parts pass through and protrude from and which is located on an end of the outer side surface in the axial direction.

In this case, the plurality of lead-pin coupling parts may be arranged in a radial direction on an end of the body in the axial direction.

Alternatively, the plurality of lead-pin coupling parts may be arranged to be symmetrical with respect to a center of the body in the axial direction.

The end surface of the housing may be provided with a plurality of through-holes through which ends of the plurality of lead-pin coupling parts may pass through and protrude from the end surface of the housing, wherein the number of the plurality of through-holes may be greater than or equal to the number of the plurality of lead-pin coupling parts.

Each of the plurality of lead-pin coupling parts may include at least one lead-pin coupling port.

The number of the plurality of lead-pin coupling parts may be four, the four lead-pin coupling parts may be located on the end of the body in the axial direction to be spaced the same distance from one another, and each of the plurality of lead-pin coupling parts may include two lead-pin coupling ports arranged to be parallel.

The plurality of lead-pin coupling parts may include a first lead-pin coupling part and a second lead-pin coupling part spaced apart from the first led-pin coupling part, and two lead pins may be coupled to the first lead-pin coupling part.

The plurality of lead-pin coupling parts may include a first lead-pin coupling part and a second lead-pin coupling part spaced apart from the first led-pin coupling part, and one lead pin may be coupled to each of the first lead-pin coupling part and the second lead-pin coupling part.

Each of the plurality of lead-pin coupling parts may include two lead-pin coupling ports and a coil guide groove between the two lead-pin coupling ports.

According to another aspect of the present disclosure, there is provided a solenoid coil assembly with a plurality of solenoid coil structures, wherein at least one lead pin is coupled to each of the plurality of solenoid coil structures, a lead pin among the at least one lead pin coupled to each of the plurality of solenoid coil structures is arranged in a straight line, and the solenoid coil assembly may further include a first bus bar configured to connect lead pins arranged in the straight pin among the at least one lead pin coupled to each of the plurality of solenoid coil structures.

In this case, the first bus bar may include a linear section for connecting three or more adjacent lead pins.

The solenoid coil assembly may further include a second bus bar configured to connect the other lead pins of the plurality of solenoid coil structures when two or more lead pins are coupled to each of the plurality of solenoid coil structures.

The first bus bar and the second bus bar may be arranged to be parallel.

According to another aspect of the present disclosure, there is provided a control device with a plurality of solenoid coil structures, in which at least one lead pin is coupled to each of the plurality of solenoid coil structures and a lead pin among the at least one lead pin is arranged in a straight line. The control device includes: a first controller configured to control a current to be transmitted to the plurality of solenoid coil structures; a second controller configured to control the current to be transmitted to the plurality of solenoid coil structures together with the first controller or in place of the first controller when the first controller malfunctions; a first bus bar configured to connect lead pins arranged in the straight pin among the at least one lead pin coupled to each of the plurality of solenoid coil structures; a first lead wire configured to connect the first bus bar to the first controller; and a second lead wire configured to connect the first bus bar to the second controller.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
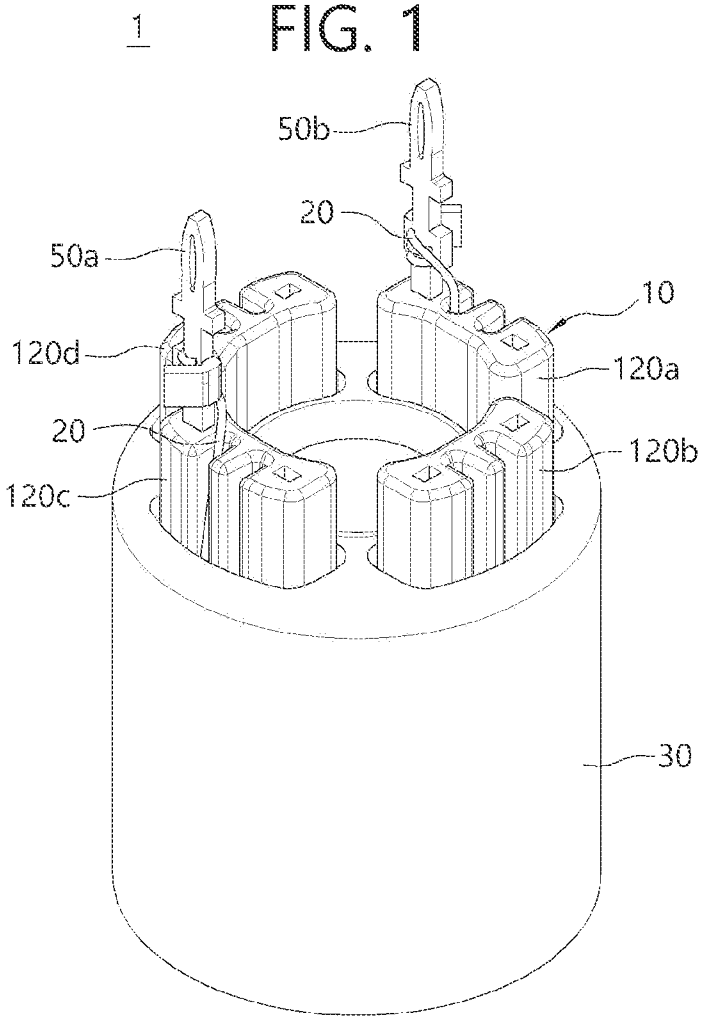
FIG. 1 is a perspective view of a solenoid coil structure according to an embodiment of the present disclosure.

Hereinafter, embodiments of the present disclosure will be described in detail with reference to the accompanying drawings below so that they may be easily implemented by those of ordinary skill in the art. However, the present disclosure may be embodied in many different forms and is not limited to the embodiments set forth herein. For clarity, parts that are not related to explaining the present disclosure are omitted in the drawings, and the same reference numerals are allocated to the same or like components throughout the specification.

It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

In the present specification, terms, such as "front", "rear", "on" and "below", which are spatially relative terms, may be used to describe a correlation between components illustrated in the drawings. The terms are relative terms determined with respect to the components illustrated in the drawings and thus the positional relationship between the components may be construed as opposed to that illustrated in the drawings according to the orientation of the components.

When a component is in "front" of, at the "rear" of, "on" or "below" another component, it will be understood to mean that the component is located in "front" of, at the "rear" of, "on" or "below" the other component while in direct contact with the other component or another component is located between the component and the other component unless specified otherwise. When a component is "connected to" another component, it will be understood to mean that the component is connected directly or indirectly to another component unless specified otherwise.

FIG. 1 is a perspective view of a solenoid coil structure according to an embodiment of the present disclosure.

Referring to FIG. 1, a solenoid coil structure 1 according to an embodiment of the present disclosure includes a bobbin 10 that provides a plurality of lead-pin coupling portions 120*a*, 120*b*, 120*c*, and 120*d*. Accordingly, a high degree of freedom in selecting a coupling position of a lead pin 50 including a first lead pin 50*a* and a second lead pin 50*b* is provided.

The solenoid coil structure 1 according to an embodiment of the present disclosure may be used for a solenoid valve of a brake electronic control unit (ECU) such as an anti-lock brake system (ABS) ECU or an electronic stability control (ESC) system ECU. In addition, the solenoid coil structure 1 according to an embodiment of the present disclosure is available in various types of circuits.

Figure 2:
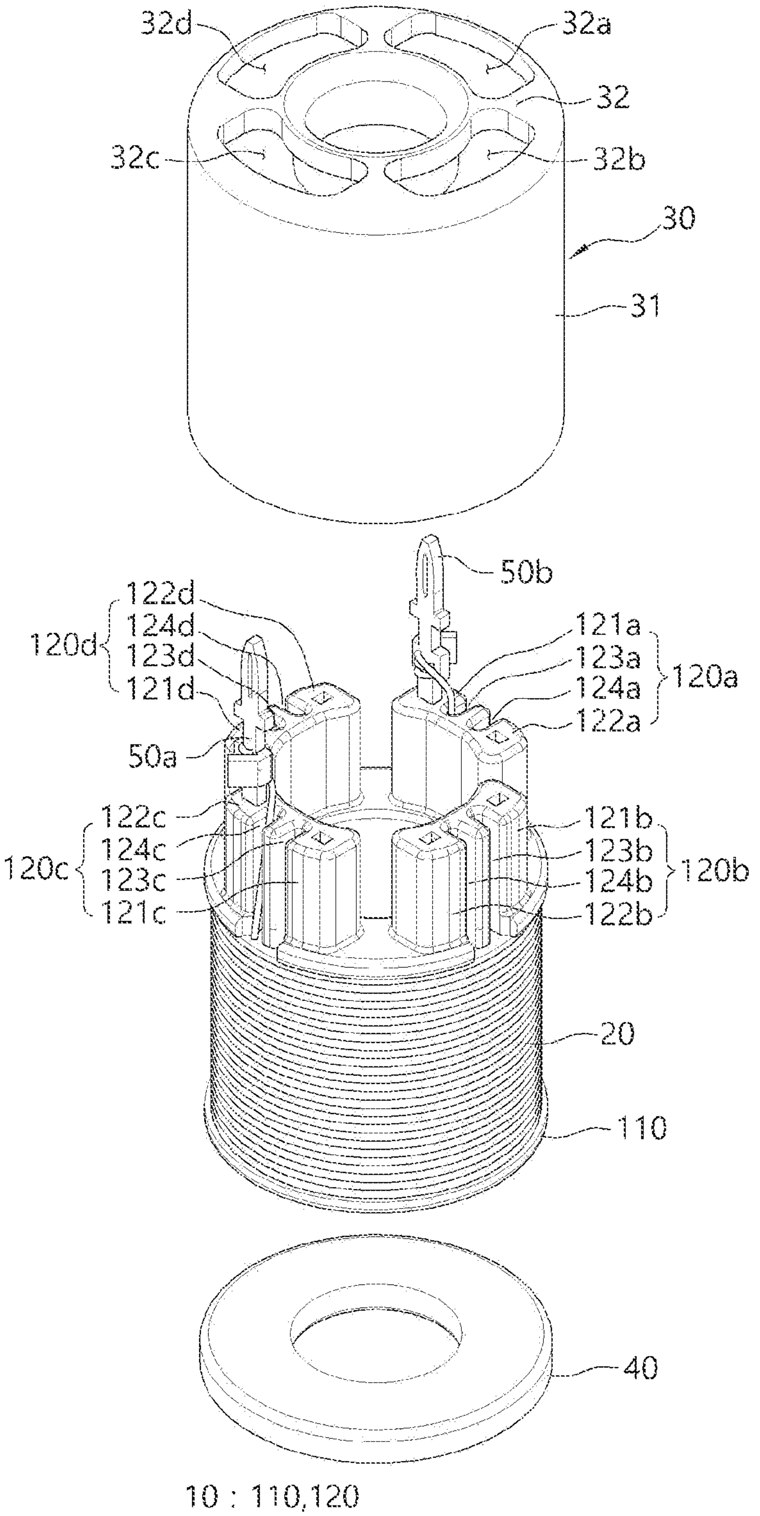
FIGS. 2 and 3 are exploded perspective views of a solenoid coil structure according to an embodiment of the present disclosure.
Figure 3:
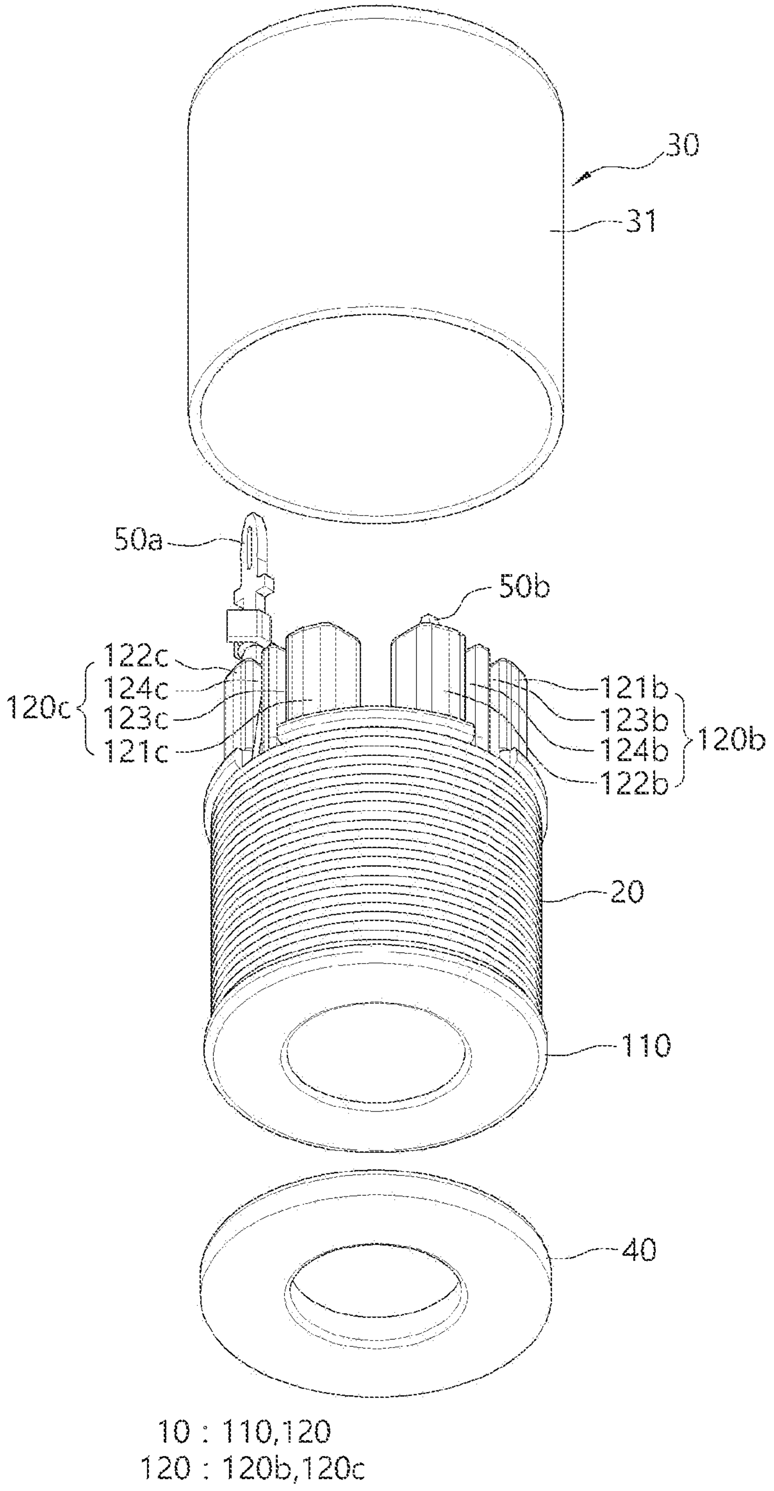

FIGS. 2 and 3 are exploded perspective views of a solenoid coil structure according to an embodiment of the present disclosure.

Referring to FIGS. 2 and 3, a solenoid coil structure 1 according to an embodiment of the present disclosure includes a bobbin 10, a coil 20, a housing 30, a lower cover 40, and a lead pin 50.

Figure 4:
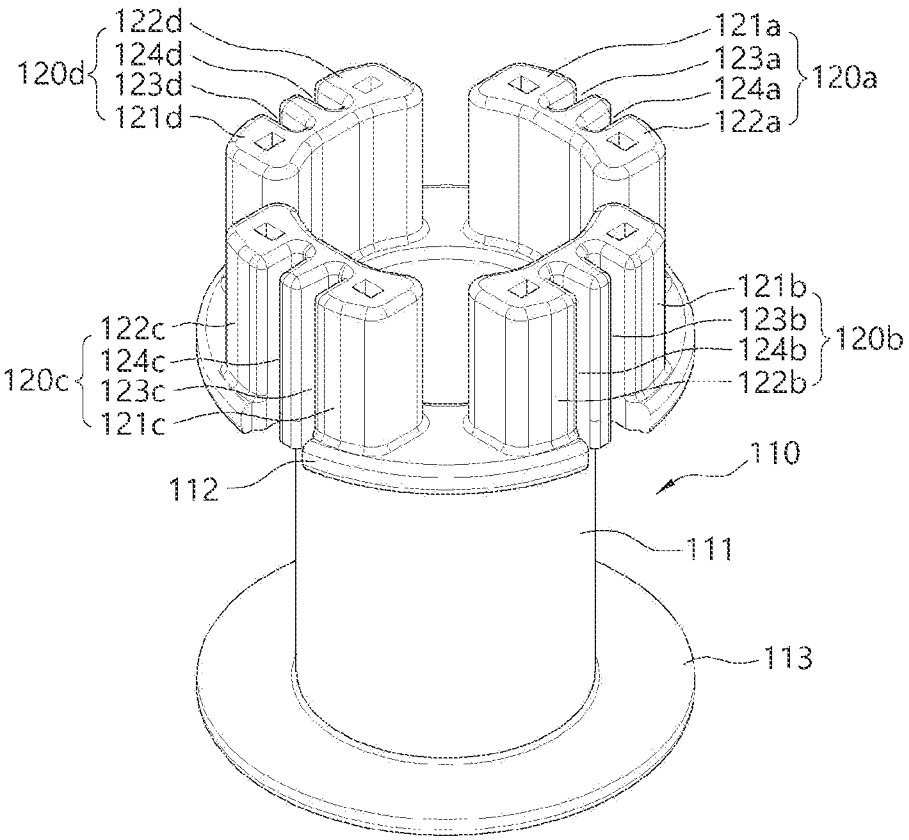
FIG. 4 is a perspective view of a bobbin of a solenoid coil structure according to an embodiment of the present disclosure.

The bobbin 10 is a part about which the coil 20 is wound and to which the lead pin 50 connected to the coil 20 is coupled. Referring to FIG. 4, the bobbin 10 includes a cylindrical body 110, and a lead-pin coupling part 120 extending on the body 110 in an axial direction.

The body 110 includes a cylindrical winding part 111 having an outer circumferential surface about which the coil 20 is wound, an upper flange 112 extending outward from an upper end of the winding part 111 in a radial direction, and a lower flange 113 extending outward from a lower end of the winding part 111 in the radial direction.

Figure 5:
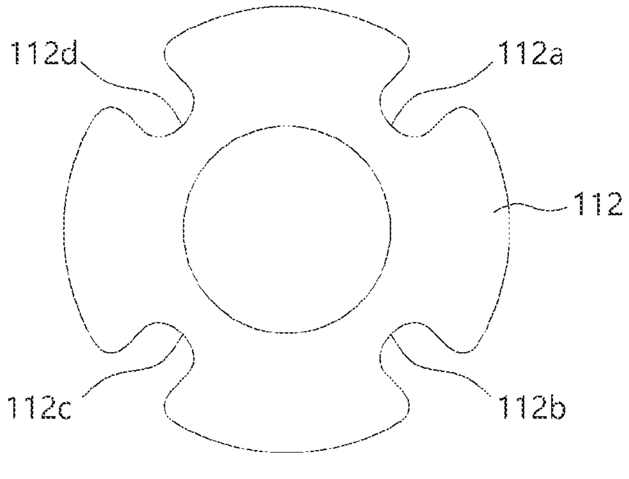
FIG. 5 is a plan view of an upper flange of a bobbin of a solenoid coil structure according to an embodiment of the present disclosure.

Referring to FIG. 5, the upper flange 112 includes recessed portions 112*a*, 112*b*, 112*c*, and 112*d* that are recessed inward along a circumferential surface thereof. The four recessed portions 112*a*, 112*b*, 112*c*, and 112*d* are formed at regular intervals along the circumferential surface of the upper flange 112. The four recessed portions 112*a*, 112*b*, 112*c* and 112*d* of the upper flange 112 allow lower portions of coil guide grooves 123*a*, 124*a*, 123*b*, 124*b*, 123*c*, 124*c*, 123*d* and 124*d* of the four lead-pin coupling portions 120*a*, 120*b*, 120*c* and 120*d*, which will be described below, to be open without being blocked by the upper flange 112. As a result, an end portion of the coil 20 wound about the winding part 111 may be easily inserted into the coil guide grooves 123*a*, 124*a*, 123*b*, 124*b*, 123*c*, 124*c*, 123*d* and 124*d* for connection with the lead pin 50.

The lead-pin coupling part 120 is a part in which the lead pin 50 connected to the coil 20 is fixed. In an embodiment of the present disclosure, the lead-pin coupling part 120 extends in the axial direction on the upper flange 112 of the body 110 of the bobbin 10. Here, the axial direction refers to a longitudinal axis of the body 110.

In the present disclosure, a plurality of the lead-pin coupling parts 120 are provided. For example, in an embodiment of the present disclosure, four lead-pin coupling parts 120 are provided. That is, according to an embodiment of the present disclosure, the lead-pin coupling part 120 of the solenoid coil structure 1 includes a first lead-pin coupling part 120*a*, a second lead-pin coupling part 120*b*, a third lead-pin coupling part 120*c*, and a fourth lead-pin coupling part 120*d*.

In an embodiment of the present disclosure, the four lead-pin coupling parts 120*a*, 120*b*, 120*c*, and 120*d* are arranged on an end of the body 110 in the axial direction to be spaced the same distance from one another. More specifically, the four lead-pin coupling parts 120*a*, 120*b*, 120*c*, and 120*d* are radially arranged at the end of the body 110 in the axial direction. In addition, the four lead-pin coupling parts 120*a*, 120*b*, 120*c*, and 120*d* are symmetrical with one another with respect to the center of the body 110 in the axial direction.

In the present disclosure, each of the plurality of lead-pin coupling parts 120 includes at least one lead-pin coupling port. For example, each of the plurality of lead-pin coupling parts 120 may include two lead-pin coupling ports arranged to be parallel. In this case, the lead-pin coupling ports may be in a form into which lead pins may be interference-fitted. However, the lead-pin coupling ports may provide various other fixation methods within a range of fixing lead pins, as well as an interference fitting method.

In an embodiment of the present disclosure, the first lead-pin coupling part 120*a* includes a first lead-pin coupling port 121*a* and a second lead-pin coupling port 122*a* that are formed in the axial direction such that lead pins are insertable thereinto and are arranged to be parallel. The second lead-pin coupling part 120*b* may include a first lead-pin coupling port 121*b* and a second lead-pin coupling port 122*b* that are formed in the axial direction such that lead pins are insertable thereinto and are arranged to be parallel, the third lead-pin coupling part 120*c* may include a first lead-pin coupling port 121*c* and a second lead-pin coupling port 122*c* that are formed in the axial direction such that lead pins are insertable thereinto and are arranged to be parallel, and the fourth lead-pin coupling part 120*d* may include a first lead-pin coupling port 121*d* and a second lead-pin coupling port 122*d* that are formed in the axial direction such that lead pins are insertable thereinto and are arranged to be parallel.

In an embodiment of the present disclosure, each of the plurality of lead-pin coupling parts 120 includes a coil guide groove between two lead-pin coupling ports. The coil guide groove guides an end of the coil 20, which is to be coupled to the lead pin 50, to easily approach the lead pin 50.

Specifically, in the first lead-pin coupling part 120*a*, the first coil guide groove 123*a* and the second coil guide groove 124*a* are formed between the first lead-pin coupling port 121*a* and the second lead-pin coupling port 122*a* in a direction extending along a longitudinal axis of the body 110. In the second lead-pin coupling part 120*b*, the first coil guide groove 123*b* and the second coil guide groove 124*b* are formed between the first lead-pin coupling port 121*b* and the second lead-pin coupling port 122*b* in the direction extending along the longitudinal direction of the body 110; in the third lead-pin coupling part 120*c*, the first coil guide groove 123*c* and the second coil guide groove 124*c* are formed between the first lead-pin coupling port 121*c* and the second lead-pin coupling port 122*c* in the direction extending along the longitudinal direction of the body 110; and in the fourth lead-pin coupling part 120*d*, the first coil guide groove 123*d* and the second coil guide groove 124*d* are formed between the first lead-pin coupling port 121*d* and the second lead-pin coupling port 122*d* in the direction extending along the longitudinal direction of the body 110.

As described above, the coil guide grooves 123*a*, 124*a*, 123*b*, 124*b*, 123*c*, 124*c*, 123*d* and 124*d* of the plurality of lead-pin coupling parts 120 are formed at positions corresponding to the recessed portions 112*a*, 112*b*, 112*c*, and 112*d* of the upper flange 112 and thus lower portions thereof are not blocked by the upper flange 112. Therefore, the coil 20 is easily insertable into the lower portions of the coil guide grooves 123*a*, 124*a*, 123*b*, 124*b*, 123*c*, 124*c*, 123*d* and 124*d*.

The coil 20 is wound about the body 110 of the bobbin 10. The coil 20 may be connected to one or more lead pins 50 coupled to the lead-pin coupling part 120 of the bobbin 10 to be electrically connected to the outside.

The housing 30 covers the bobbin 10 about which the coil 20 is wound. In an embodiment of the present disclosure, the housing 30 includes an outer surface 31 covering an outer circumferential surface of the body 110, and an end surface 32 which the lead-pin coupling part 120 passes through to protrude therefrom and which is arranged on an end of the outer surface 31 in the axial direction.

The end surface 32 of the housing 30 is provided with a plurality of through-holes through which an end of the lead-pin coupling part 120 passes through and protrudes from the end surface 32. In an embodiment of the present disclosure, the end surface 32 of the housing 30 is provided with four through-holes 32*a*, 32*b*, 32*c*, and 32*d* corresponding to the four lead-pin coupling parts 120*a*, 120*b*, 120*c*, and 120*d*.

In the present disclosure, the number of the plurality of through-holes may be greater than or equal to the number of the plurality of lead-pin coupling parts 120. In other words, in a state in which the end surface 32 of the housing 30 is provided with a certain number of through-holes, increasing or decreasing the number of the plurality of lead-pin coupling parts 120 may be considered according to a desired degree of freedom in selecting a lead-pin coupling position so that the number of lead-pin coupling parts 120 may be two or more.

The lower cover 40 covers a lower portion of the housing 30. In an embodiment of the present disclosure, the lower cover 40 is coupled to an end of the housing 30 opposite the end face 32 and has a ring shape.

The lead pin 50 electrically connects the coil 20 to the outside. The lead pin 50 is connected to the coil 20 and a bus bar while being fixed on the lead-pin coupling port of the lead-pin coupling part 120 of the bobbin 10. That is, the lead pin 50 functions as an electrical connection interface, and the coil 20 and the bus bar are electrically connected through the lead pin 50.

Two or more lead pins 50 may be provided. In other words, one solenoid coil structure 1 may include two or more lead pins 50. In an embodiment of the present disclosure, the lead pin 50 includes a first lead pin 50*a* and a second lead pin 50*b*.

As described above, in the solenoid coil structure 1 according to an embodiment of the present disclosure, a coupling position of the lead pin 50 may be freely selected through the plurality of lead-pin coupling parts 120 extending in the axial direction on the body 110 of the bobbin 10. More specifically, the solenoid coil structure 1 according to an embodiment of the present disclosure includes two lead-pin coupling ports and is provided with the four lead pins 120A, 120B, 120C, and 120D arranged in the radial direction. The first lead pin 50*a* is coupled to the fourth lead-pin coupling part 120*d*, and the second lead pin 50*b* is coupled to the first lead-pin coupling part 120*a*.

Figure 6:
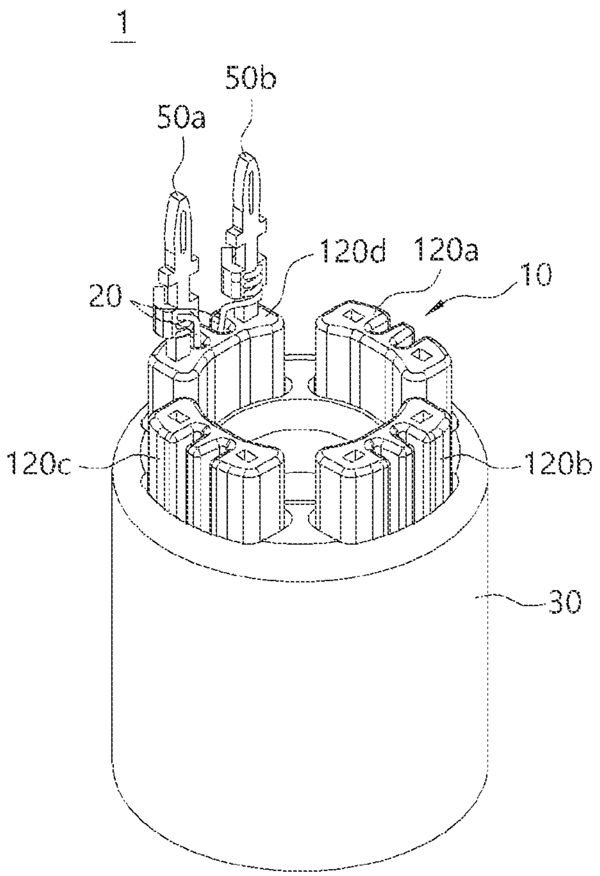
FIGS. 6 and 7 are diagrams illustrating modified examples of a coupling position of a lead pin of a solenoid coil structure according to an embodiment of the present disclosure.
Figure 7:
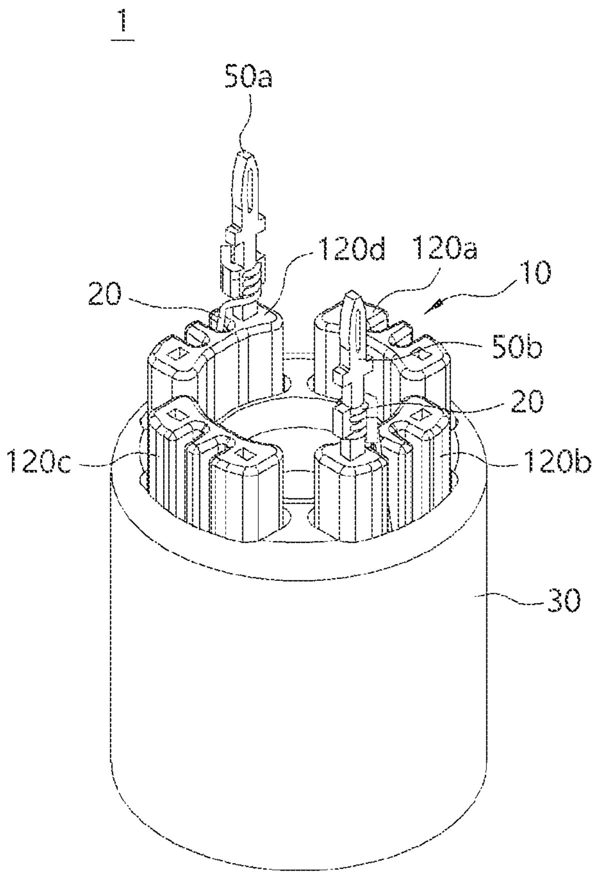

FIGS. 6 and 7 illustrate modified examples of a coupling position of a lead pin of a solenoid coil structure according to an embodiment of the present disclosure.

In the modified example of FIG. 6, both the first lead pin 50*a* and the second lead pin 50*b* are coupled to the fourth lead-pin coupling part 120*d*. In the modified example of FIG. 7, the first lead pin 50*a* is coupled to the fourth lead-pin coupling part 120*d*, and the second lead pin 50*b* is coupled to the second lead-pin coupling part 120*b*.

As described above, in an embodiment of the present disclosure, two lead pins may be coupled to one of the plurality of lead-pin coupling parts 120 or one lead pin may be coupled to two lead pins spaced apart from each other.

A solenoid coil assembly with a plurality of solenoid coil structures 1 according to an embodiment of the present disclosure will be described below.

The solenoid coil assembly according to an embodiment of the present disclosure includes a plurality of solenoid coil structures 1 according to an embodiment of the present disclosure and one or more bus bars. At least one lead pin is coupled to each of the plurality of solenoid coil structures 1, a lead pin among the at least one lead pin is arranged in a straight line, and at least one bus bar connects lead pins arranged in a line.

Figure 8:
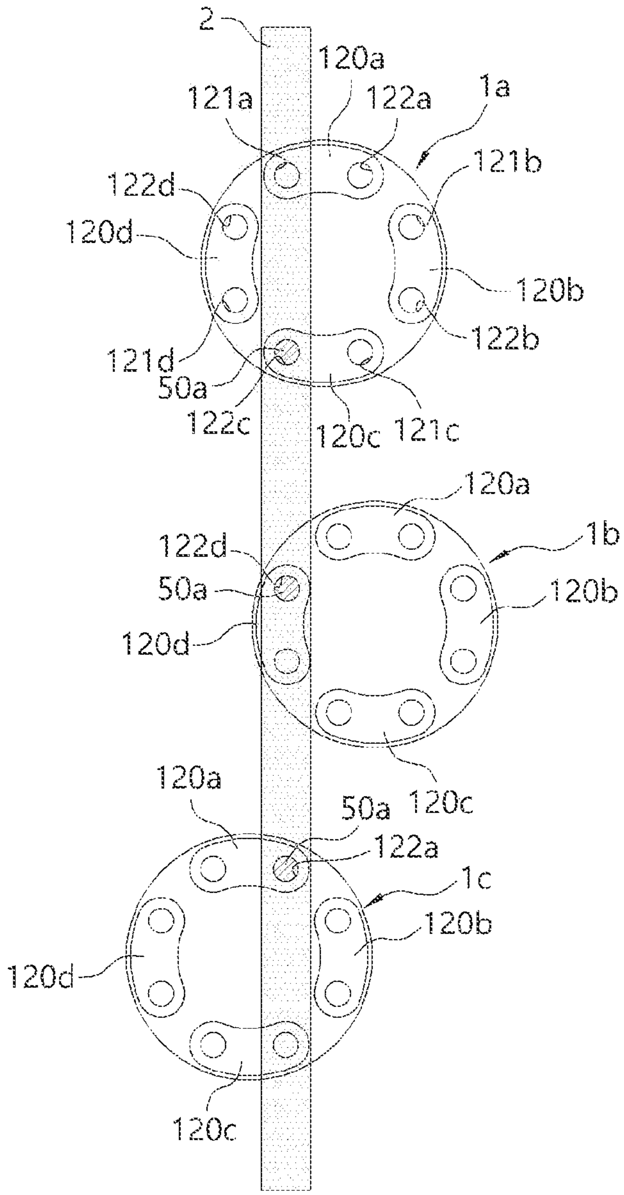
FIG. 8 is a diagram illustrating a solenoid coil assembly according to an embodiment of the present disclosure.

FIG. 8 is a diagram illustrating a solenoid coil assembly according to an embodiment of the present disclosure.

Referring to FIG. 8, a solenoid coil assembly according to an embodiment of the present disclosure includes three solenoid coil structures 1*a*, 1*b*, and 1*c*. At least one lead pin 50*a* is coupled to each of the three solenoid coil structures 1*a*, 1*b*, and 1*c*.

Specifically, in the first solenoid coil structure 1*a*, the first lead pin 50*a* is coupled to a second lead-pin coupling port 122*c* of a third lead-pin coupling part 120*c*. In the second solenoid coil structure 1*b*, the first lead pin 50*a* is coupled to a second lead-pin coupling port 122*d* of a fourth lead-pin coupling part 120*d*, and in the third solenoid coil structure 1*c*, the first lead pin 50*a* is coupled to a second lead-pin coupling port 122*a* of the first lead-pin coupling part 120*a*. In this case, the above three first lead pin 50*a* are arranged in a straight line.

A first bus bar 2 includes a straight-line section for connecting the three first lead pins 50*a* arranged in the straight line. In other words, the first bus bar 2 may function as a common bus bar.

Figure 9:
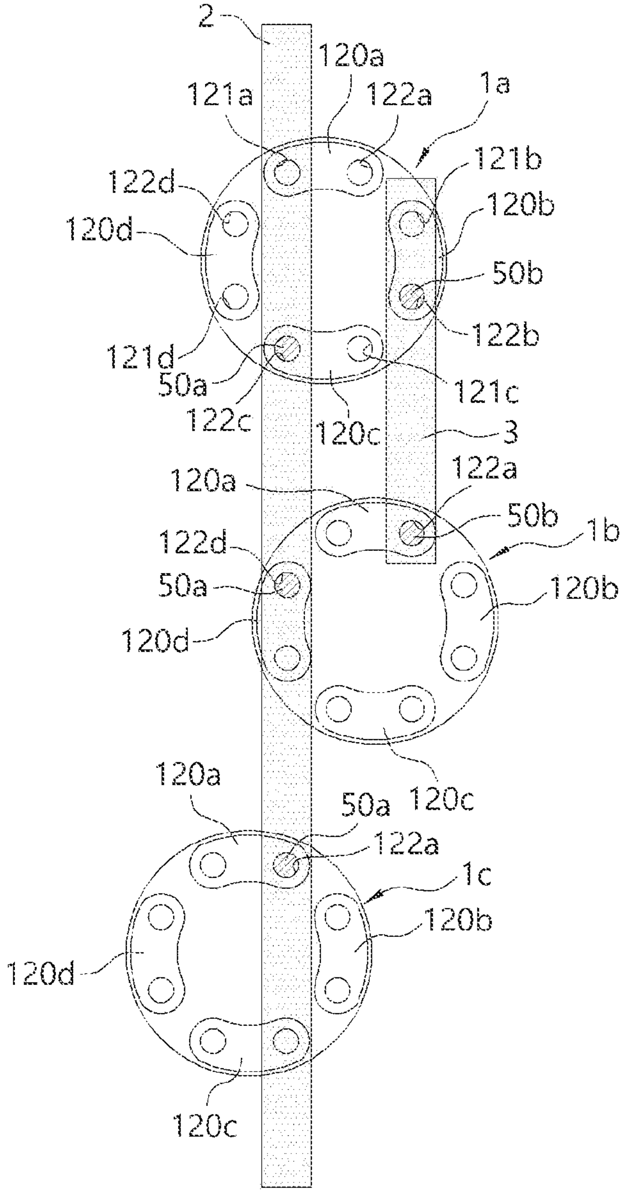
FIG. 9 is a conceptual diagram illustrating a state in which a second bus bar is further included in a solenoid coil assembly according to an embodiment of the present disclosure.

FIG. 9 is a conceptual diagram illustrating a state in which a second bus bar is further included in a solenoid coil assembly according to an embodiment of the present disclosure.

Referring to FIG. 9, in a solenoid coil assembly according to an embodiment of the present disclosure, a second lead pin 50*b* is additionally coupled to a second lead-pin coupling port 122*b* of a second lead-pin coupling part 120*b* in a first solenoid coil structure 1*a*, and a second lead pin 50*b* is additionally coupled to a second lead-pin coupling port 122*a* of a first lead-pin coupling part 120*a* in a second solenoid coil structure 1*b*.

Among lead pins 50*a* and 50*b* coupled to each of a plurality of solenoid coil structures 1*a*, 1*b*, and 1*c*, lead pins 50*b* that are not coupled to a first bus bar 2 are connected to a second bus bar 3. In this case, the first bus bar 2 and the second bus bar 3 may be arranged to be parallel.

As described above, the second bus bar 3 may connect at least two lead pins among lead pins that are not connected to the first bus bar 2. The second bus bar 3 may be arranged to be parallel with the first bus bar 2. Accordingly, spatial efficiency may be improved.

Figure 10:
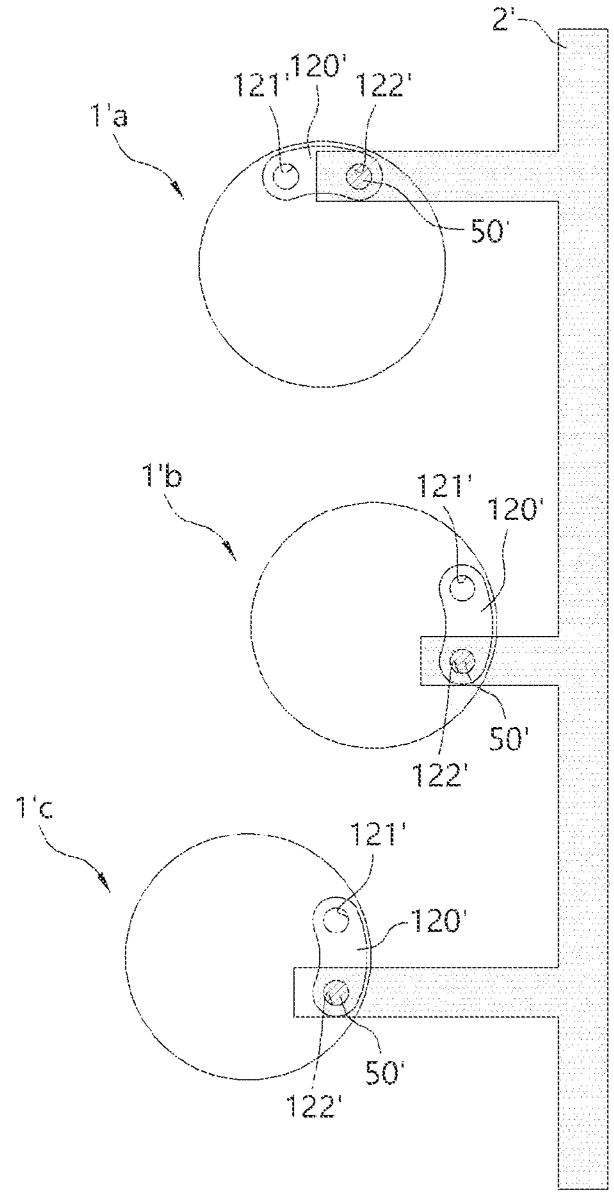
FIG. 10 is a diagram illustrating an example of a solenoid coil assembly in which a solenoid coil structure that is not an embodiment of the present disclosure is provided.

FIG. 10 illustrates a solenoid coil assembly in which solenoid coil structures 1'*a*, 1'*b*, and 1'*c*, which are not an embodiment of the disclosure, are arranged. Each of the solenoid coil structures 1'*a*, 1'*b*, and 1'*c* of FIG. 10 provides only one lead pin coupling part 120', thereby causing a complicated form of a common bus bar 2' for connecting all the lead pins 50' coupled to the solenoid coil structures 1'*a*, 1'*b* and 1'*c*.

As described above, according to as a solenoid coil assembly of an embodiment of the present disclosure, a degree of freedom in selecting a lead-pin coupling position in an individual solenoid coil structure is high and thus a linear bus bar is available. Therefore, when the solenoid coil assembly is configured, space efficiency can be secured, a shape of a bus bar can be simplified, and the number of bus bars can be reduced.

For example, when a solenoid coil assembly according to an embodiment of the present disclosure is applied to a solenoid valve, a degree of freedom in selecting a lead pin coupling position is very high. Accordingly, it is not necessary to add a bus bar according to the position of the valve or configure a dual system of the solenoid coil structure.

Figure 11:
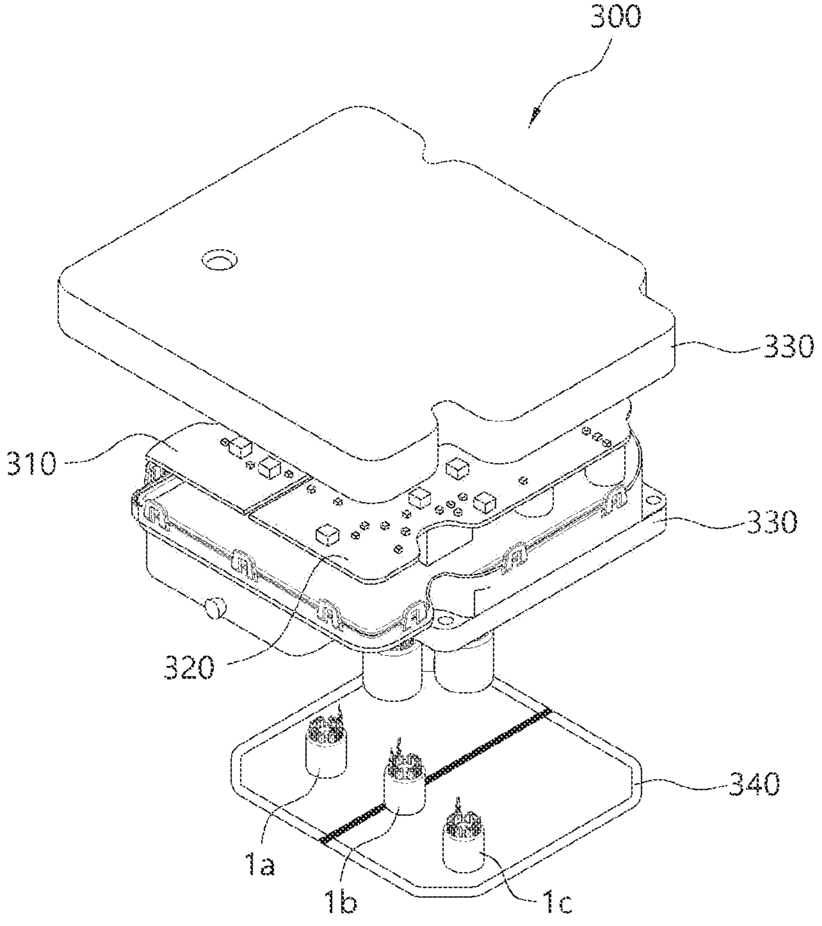
FIG. 11 is a perspective view of a control device according to an embodiment of the present disclosure.
Figure 12:
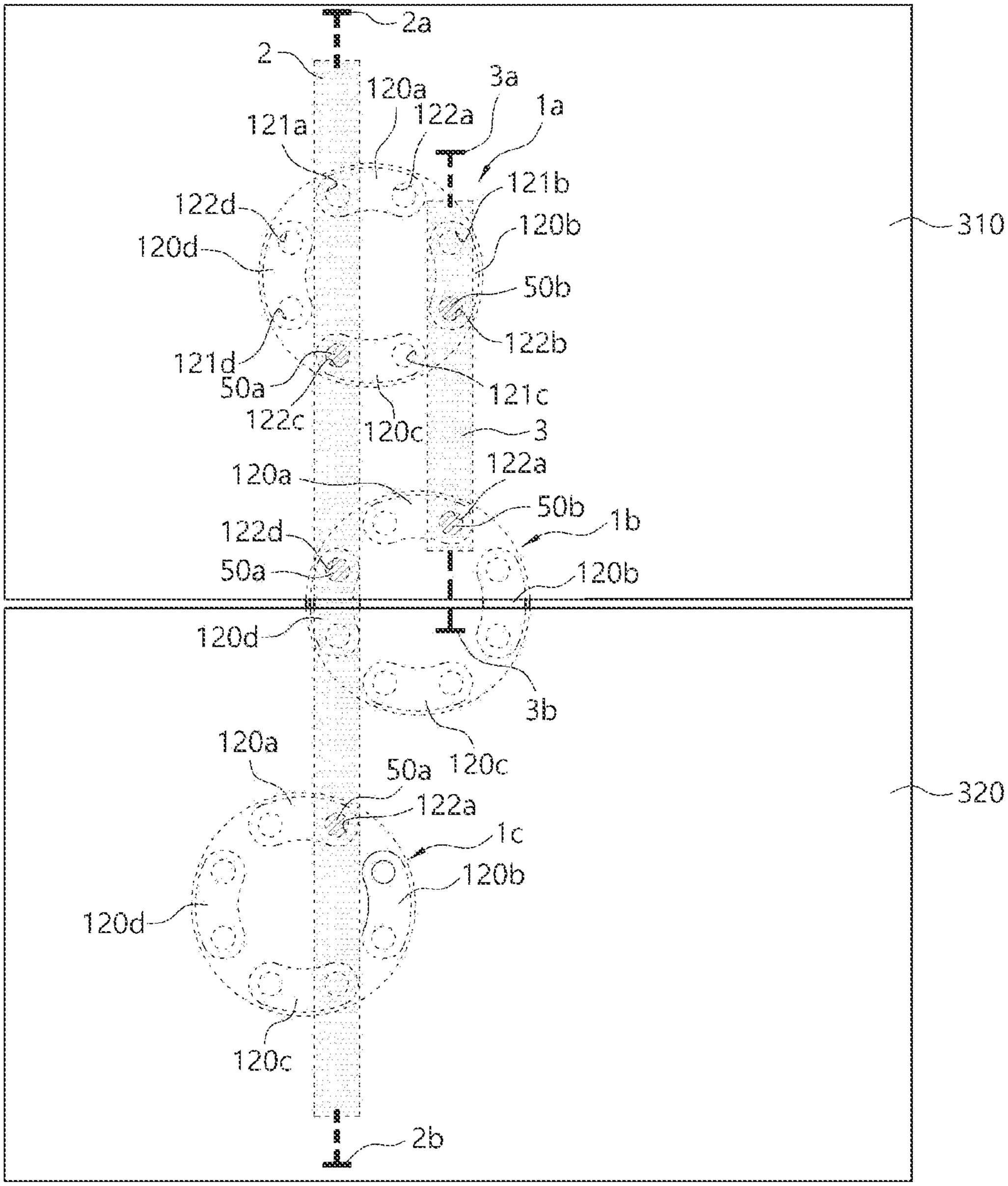
FIG. 12 is a plan view of some components of a control device according to an embodiment of the present disclosure.
Figure 13:
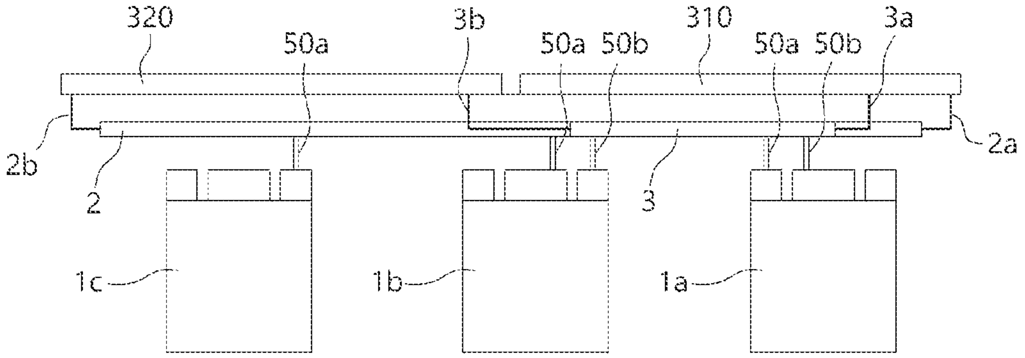
FIG. 13 is a side view of the control device of FIG. 12.

FIG. 11 is a perspective view of a control device according to an embodiment of the present disclosure. FIG. 12 is a plan view of some components of a control device according to an embodiment of the present disclosure. FIG. 13 is a side view of the control device of FIG. 12

For a brief description, a first bus bar 2, a second bus bar 3, a first lead wire 2*a*, a second lead wire 2*b*, a third lead wire 3*a*, and a fourth lead wire 3*b* are omitted in FIG. 11. In FIGS. 12 and 13, a cover 330, a housing 330, and a gasket 40 are omitted.

A control device according to an embodiment of the present disclosure is capable of controlling a flow of a pressurized fluid in a brake system of a vehicle. That is, the control device according to an embodiment of the present disclosure may control a pump or a flow path on the basis of the displacement of a brake pedal and sensing information from various types of sensors so that a fluid pressure may be applied to a wheel cylinder of each wheel of a vehicle so as to generate braking power or a fluid pressure applied to the wheel cylinder may be removed to cancel braking power.

Referring to FIGS. 11 to 13, the control device according to an embodiment of the present disclosure includes a plurality of solenoid coil structures 1*a*, 1*b*, and 1*c*, a first controller 310, a second controller 320, a first bus bar 2, a second bus bar 3, a first lead wire 2*a*, a second lead wire 2*b*, a third lead wire 3*a*, and a fourth lead wire 3*b*.

The control device according to an embodiment of the present disclosure may further include a housing 330 in which the first controller 310 and the second controller 320 are disposed, a cover 310 covering a side of the housing 330, and a gasket 340 disposed on another side of the housing 330 to seal the housing 330. In this case, the cover 310 may function as a heat dissipater for emitting heat generated in the first controller 310 and the second controller 320 to the outside. The plurality of solenoid coil structures 1*a*, 1*b* and 1*c* may be disposed on the other side of the housing 330.

In the control device according to an embodiment of the present disclosure, the solenoid coil structures 1*a*, 1*b*, and 1*c* may be disposed in a flow path of a brake system of a vehicle, through which a pressurized fluid flows, to function as solenoid values that are controlled to be closed or opened. The flow of a pressurized fluid in the flow path may be controlled by opening or closing the solenoid valve, and as the pressurized fluid flows, a fluid pressure may be applied to the wheel cylinder of each wheel of the vehicle to generate braking power or a fluid pressure applied to the wheel cylinder may be removed to release braking power.

In an embodiment of the present disclosure, in the first solenoid coil structure 1*a*, a first lead pin 50*a* is coupled to a second lead-pin coupling port 122*c* of a third lead-pin coupling part 120*c*. In the second solenoid coil structure 1*b*, a first lead pin 50*a* is coupled to a second lead-pin coupling port 122*d* of a fourth lead-pin coupling part 120*d*, and in the third solenoid coil structure 1*c*, a first lead pin 50*a* is coupled to a second lead-pin coupling port 122*a* of a first lead-pin coupling part 120*a*. In this case, the three first lead pins 50*a* are arranged in a straight line.

In addition, in the first solenoid coil structure 1*a*, a second lead pin 50*b* is coupled to a second lead-pin coupling port 122*b* of a second lead-pin coupling part 120*b*, and in the second solenoid coil structure 1*b*, a second lead pin 50*b* is coupled to a second lead-pin coupling port 122*a* of a first lead-pin coupling part 120*a*.

The first controller 310 controls a current to be transmitted to the first to third solenoid coil structures 1*a*, 1*b*, and 1*c*. The first controller 310 may control a current to be transmitted to the first to third solenoid coil structures 1*a*, 1*b* and 1*c* on the basis of the displacement of the brake pedal, sensing information from various types of sensors disposed in the flow path of a pressurized fluid, and the like, thereby controlling a solenoid valve. The first controller 310 may be provided on a printed circuit board (PCB) and may include a pattern for transmitting an electrical signal.

The second controller 320 controls a current to be transmitted to the first to third solenoid coil structures 1*a*, 1*b* and 1*c* together with the first controller 310 or in place of the first controller 310 when the first controller 310 malfunctions. That is, the second controller 320 is provided as redundancy of the first controller 310 to provide stability to a brake system. The second controller 320 may perform controlling on the basis of the displacement of the brake pedal, sensing information from various types of sensors disposed in a flow path of a pressurized fluid, and the like, similarly to the first controller 310. The second controller 320 may be provided on the PCB and may include a pattern for transmitting an electrical signal.

The first bus bar 2 connects the three first lead pins 50*a* arranged in a straight line. Among the lead pins 50*a* and 50*b* coupled to the solenoid coil structures 1*a*, 1*b*, and 1*c*, lead pins 50*b* that are not coupled to the first bus bar 2 are connected to the second bus bar 3. In this case, the first bus bar 2 and the second bus bar 3 are in a linear form and are arranged to be parallel.

The first lead wire 2*a* connects the first bus bar 2 to the first controller 310, and the second lead wire 2*b* connects the first bus bar 2 to the second controller 320. The third lead wire 3*a* connects the second bus bar 3 to the first controller 310, and the fourth lead wire 3*b* connects the second bus bar 3 to the second controller 320.

In a control device according to an embodiment of the present disclosure, a solenoid coil structure provides a high degree of freedom in selecting a lead pin coupling position and thus a linear bus bar is applicable thereto. Therefore, spatial efficiency may be secured even when a solenoid coil assembly is connected to two controllers.

While embodiments of the present disclosure have been described above, the scope of the present disclosure is not limited thereto, and other embodiments may be easily derived by those of ordinary skill in the art who understand the spirit of the present disclosure by adding, changing, or deleting components without departing from the scope of the present disclosure. The other embodiments should be understood to be within the scope of the present disclosure.

What is claimed is:

1. A solenoid coil structure comprising:

a coil;

a lead pin connected to the coil;

a bobbin having a cylindrical body about which the coil is wound and a plurality of lead-pin coupling parts extending on the body in an axial direction; and a housing having an outer side surface covering an outer circumferential surface of the body, and an end surface which the plurality of lead-pin coupling parts pass through and protrude from and which is located on an end of the outer side surface in the axial direction, wherein the body of the bobbin includes a flange extending outward in a radial direction and having a recessed portion recessed inward in the radial direction, and each of the plurality of lead-pin coupling parts includes:

two lead-pin coupling ports adjacent to the recessed portion of the flange, the lead pin being coupled to one of the two lead-pin coupling ports; and a coil guide groove between the two lead-pin coupling ports and in the recessed portion of the flange, an end portion of the coil being inserted in the coil guide groove.

2. The solenoid coil structure of claim 1, wherein the plurality of lead-pin coupling parts are arranged in the radial direction on an end of the body in the axial direction.

3. The solenoid coil structure of claim 2, wherein the plurality of lead-pin coupling parts are arranged to be symmetrical with respect to a center of the body in the axial direction.

4. The solenoid coil structure of claim 1, wherein the end surface of the housing is provided with a plurality of through-holes through which ends of the plurality of lead-pin coupling parts pass through and protrude from the end surface of the housing, and wherein the number of the plurality of through-holes is greater than or equal to the number of the plurality of lead-pin coupling parts.

5. The solenoid coil structure of claim 1, wherein the number of the plurality of lead-pin coupling parts is four, wherein the four lead-pin coupling parts are located on the end of the body in the axial direction and spaced a same distance from one another, and in each of the plurality of lead-pin coupling parts, the two lead-pin coupling ports are arranged to be parallel.

6. The solenoid coil structure of claim 1, wherein the plurality of lead-pin coupling parts comprise a first lead-pin coupling part and a second lead-pin coupling part spaced apart from the first led-pin coupling part, and wherein two lead pins are coupled to the first lead-pin coupling part.

7. A solenoid coil assembly with a plurality of solenoid coil structures according to claim 1, wherein at least one lead pin is coupled to each of the plurality of solenoid coil structures, wherein a lead pin among the at least one lead pin coupled to each of the plurality of solenoid coil structures is arranged in a straight line, and the solenoid coil assembly further comprises a first bus bar configured to connect lead pins arranged in the straight pin among the at least one lead pin coupled to each of the plurality of solenoid coil structures.

8. The solenoid coil assembly of claim 7, wherein the first bus bar comprises a linear section for connecting three or more adjacent lead pins.

9. The solenoid coil assembly of claim 7, further comprising a second bus bar configured to connect the other lead pins coupled to the plurality of solenoid coil structures when two or more lead pins are coupled to each of the plurality of solenoid coil structures.

10. The solenoid coil assembly of claim 9, wherein the first bus bar and the second bus bar are arranged to be parallel.

11. A control device with a plurality of solenoid coil structures according to claim 1, in which at least one lead pin is coupled to each of the plurality of solenoid coil structures and a lead pin among the at least one lead pin is arranged in a straight line, the control device comprising:

a first controller configured to control a current to be transmitted to the plurality of solenoid coil structures;

a second controller configured to control the current to be transmitted to the plurality of solenoid coil structures together with the first controller or in place of the first controller when the first controller malfunctions;

a first bus bar configured to connect lead pins arranged in the straight pin among the at least one lead pin coupled to each of the plurality of solenoid coil structures;

a first lead wire configured to connect the first bus bar to the first controller; and a second lead wire configured to connect the first bus bar to the second controller.

12. The control device of claim 11, wherein the first bus bar comprises a linear section for connecting three or more adjacent lead pins.

13. The control device of claim 11, further comprising a second bus bar configured to connect the other lead pins coupled to the plurality of solenoid coil structures when two or more lead pins are coupled to each of the plurality of solenoid coil structures.

14. The control device of claim 13, wherein the first bus bar and the second bus bar are arranged to be parallel.

* * * * *